(12) United States Patent
Xu et al.

(10) Patent No.: US 10,983,621 B2
(45) Date of Patent: Apr. 20, 2021

(54) TOUCH DISPLAY DEVICE AND DRIVING METHOD THEREOF

(71) Applicants: Hefei BOE Optoelectronics Technology Co., Ltd., Anhui (CN); BOE Technology Group Co., Ltd., Beijing (CN)

(72) Inventors: Jun Xu, Beijing (CN); Tongmin Liu, Beijing (CN); Jin Sha, Beijing (CN); Dayu Zhang, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/640,986

(22) PCT Filed: Sep. 24, 2019

(86) PCT No.: PCT/CN2019/107576
§ 371 (c)(1),
(2) Date: Feb. 21, 2020

(87) PCT Pub. No.: WO2020/078175
PCT Pub. Date: Apr. 23, 2020

(65) Prior Publication Data
US 2020/0341574 A1 Oct. 29, 2020

(30) Foreign Application Priority Data
Oct. 19, 2018 (CN) .......................... 201811220720.3

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/133528* (2013.01);
(Continued)

(58) Field of Classification Search
CPC .... G06F 3/0412; G06F 3/0447; G06F 3/0416; G02F 1/13338; G02F 1/133528;
(Continued)

(56) References Cited

U.S. PATENT DOCUMENTS

2006/0086896 A1* 4/2006 Han ..................... H03M 11/26
250/221
2015/0185927 A1 7/2015 Inoue et al.
(Continued)

FOREIGN PATENT DOCUMENTS

CN 105373281 A 3/2016
CN 106125986 A 11/2016
(Continued)

OTHER PUBLICATIONS

Chinese Office Action in corresponding application No. 201811220720.3 dated Feb. 6, 2020.

*Primary Examiner* — Jennifer Mehmood
*Assistant Examiner* — James S Nokham
(74) *Attorney, Agent, or Firm* — Arent Fox LLP; Michael Fainberg

(57) ABSTRACT

A touch display device and a driving method thereof are provided. A driving signal line configured to drive light emitting unit to emit light is multiplexed as a detection electrode. Moreover, the capacitance is formed between the detection electrode and a transparent conductive layer, the capacitance can be changed according to a change in touch force, so that when a position of the detection electrode is pressed, a distance between the detection electrode and the transparent conductive layer changes, and the capacitance
(Continued)

between the detection electrode and the transparent conductive layer changes accordingly. In this way, a magnitude of the force at a touch position can be determined by a change in a capacitance value between the detection electrode and the transparent conductive layer, so that a force touch function can be realized.

20 Claims, 6 Drawing Sheets

(51) Int. Cl.
 *G02F 1/1333* (2006.01)
 *G02F 1/1335* (2006.01)
 *G02F 1/13357* (2006.01)
(52) U.S. Cl.
 CPC .. *G02F 1/133603* (2013.01); *G02F 1/133606* (2013.01); *G06F 3/0416* (2013.01); *G06F 3/0447* (2019.05); *G02F 1/133612* (2021.01)
(58) Field of Classification Search
 CPC ......... G02F 1/133603; G02F 1/133606; G02F 2001/133612
 See application file for complete search history.

(56) References Cited

U.S. PATENT DOCUMENTS

| | | | |
|---|---|---|---|
| 2016/0274708 A1* | 9/2016 | Hwang | .................. G06F 3/0412 |
| 2017/0090637 A1* | 3/2017 | Yoon | ................... H04M 1/0266 |
| 2017/0285830 A1* | 10/2017 | Choi | ..................... G06F 3/0412 |
| 2018/0018052 A1 | 1/2018 | Yang et al. | |
| 2018/0129330 A1 | 5/2018 | Ding et al. | |
| 2018/0224959 A1 | 8/2018 | Yang et al. | |
| 2018/0260069 A1* | 9/2018 | Suzuki | .................. G06F 3/0412 |
| 2019/0064955 A1 | 2/2019 | Wang et al. | |
| 2019/0099096 A1 | 4/2019 | Wang et al. | |

FOREIGN PATENT DOCUMENTS

| | | |
|---|---|---|
| CN | 106155413 A | 11/2016 |
| CN | 106384739 A | 2/2017 |
| CN | 106610747 A | 5/2017 |
| CN | 106708339 A | 5/2017 |
| CN | 107340917 A | 11/2017 |
| CN | 107492317 A | 12/2017 |
| CN | 107562246 A | 1/2018 |
| CN | 109298801 A | 2/2019 |
| WO | 2017071366 A1 | 5/2017 |

\* cited by examiner

TOUCH DISPLAY DEVICE AND DRIVING METHOD THEREOF

CROSS-REFERENCE TO RELATED APPLICATION

The present application is a US National Stage of International Application No. PCT/CN2019/107576, filed Sep. 24, 2019, which claims priority to a Chinese Patent Application No. 201811220720.3 filed with the Chinese Patent Office on Oct. 19, 2018 with the title "Touch Display Device and Driving Method Thereof", which is hereby incorporated by reference in its entirety.

FIELD

The present disclosure relates to the field of touch technology, and particularly to a touch display device and a driving method thereof.

BACKGROUND

Force sensing technology refers to the technology that can detect external forces. The technology has been used in industrial control, medical and other fields for a long time. At present, the way to achieve force sensing in the display field, especially in the field of mobile phones or tablets, is to additionally arrange a force-sensitive detection electrode layer in a liquid crystal display panel. Such design requires changes in the structural design of the liquid crystal display panel, the design is complicated, the thickness of the liquid crystal display panel is increased, and the cost is increased.

SUMMARY

An embodiment of the present disclosure provides a touch display device. The touch display device includes: a backlight source, including: a plurality of light emitting units, and a plurality of driving signal lines for driving the plurality of light emitting units to emit light, wherein the driving signal lines are multiplexed as detection electrodes; a display panel on a light exit side of the backlight source; and a transparent conductive layer on a side of the display panel close to the backlight source, wherein capacitance between the detection electrode and the transparent conductive layer changes according to a change in touch force.

In a possible implementation, the backlight source includes a plurality of light emitting control regions in an array, wherein each of the light emitting control regions includes a plurality of the light emitting units in an array, and each row of the light emitting units in the same light emitting control region are connected in series; and in the same light emitting control region, positive electrodes of first light emitting units in a plurality of rows are electrically connected to each other through a positive driving signal line, and negative electrodes of last light emitting units in the plurality of rows are electrically connected to each other through a negative driving signal line.

In a possible implementation, the detection electrodes include: a plurality of detection input electrodes and a plurality of detection output electrodes; and in the same light emitting control region, the negative driving signal line is multiplexed as a detection input electrode, and the positive driving signal line is multiplexed as a detection output electrode.

In a possible implementation, the detection electrodes include: a plurality of detection input electrodes and a plurality of detection output electrodes; and in the same light emitting control region, the positive driving signal line is multiplexed as a detection input electrode, and the negative driving signal line is multiplexed as a detection output electrode.

In a possible implementation, the touch display device further includes: a detection chip, configured to, in a display phase, apply a positive constant voltage signal to the positive driving signal line, and apply a light emitting control signal to the negative driving signal line in each light emitting control region; in a force detection phase, apply a detection input signal to the detection input electrode in each light emitting control region, and detect a detection output signal on the detection output electrode, and determine a change in a capacitance value between the detection input electrode and the transparent conductive layer according to the detected detection output signal, and determine a magnitude of force at a touch position according to the determined change in the capacitance value.

In a possible implementation, the light emitting units include LED chips, wherein a voltage amplitude of the detection input signal is smaller than turn-on voltages of the LED chips.

In a possible implementation, the touch display device further includes: negative lines one-to-one corresponding to the light emitting control regions and negative connection terminals one-to-one corresponding to the light emitting control regions, wherein the negative driving signal line in each light emitting control region is electrically connected to the corresponding negative connection terminal through the corresponding negative line, and each negative connection terminal is electrically connected to the detection chip.

In a possible implementation, the touch display device further includes: positive lines between column gaps of the adjacent light emitting control regions, and a positive connection terminal electrically connected to the positive lines, wherein the positive driving signal lines in each column of the light emitting control regions are electrically connected to the positive connection terminal through one positive line, and the positive connection terminal is electrically connected to the detection chip.

In a possible implementation, the backlight source further includes: a circuit board driving the light emitting units; and the circuit board includes a first substrate, a second substrate on one side of the first substrate away from the display panel, and an insulating adhesive layer bonding the first substrate and the second substrate.

In a possible implementation, the light emitting units, the positive driving signal lines, the negative driving signal lines, and the positive lines are on the first substrate.

In a possible implementation, the negative lines are on the second substrate, and are electrically connected to the corresponding negative driving signal lines through via holes penetrating through the insulating adhesive layer and the first substrate.

In a possible implementation, the positive driving signal lines are made of a same material and in a same layer.

In a possible implementation, the negative driving signal lines are made of a same material and in a same layer.

In a possible implementation, the positive driving signal lines and the negative driving signal lines are made of a same material and in a same layer.

In a possible implementation, the number of the light emitting units in each of the light emitting control regions is the same.

In a possible implementation, the display panel is a liquid crystal display panel, the liquid crystal display panel includes: an array substrate, and an opposite substrate opposite to the array substrate; and the touch display device further includes: a first polarizer on a side of the array substrate away from the opposite substrate, and a second polarizer on a side of the opposite substrate away from the array substrate, and the transparent conductive layer is between the array substrate and the first polarizer.

In a possible implementation, a material of the transparent conductive layer is indium tin oxide.

In a possible implementation, the backlight source further includes a diffusion plate on one side of the light emitting units facing to the display panel, and an optical film on a side of the diffusion plate facing to the display panel.

An embodiment of the present disclosure further provides a driving method of the touch display device according to the embodiment of the present disclosure. The method includes: a display phase and a force detection phase, wherein in the display phase, applying a display signal to the driving signal lines; in the force detection phase, applying a constant potential to the transparent conductive layer, applying a detection signal to the driving signal lines, and performing touch detection according to a change in capacitance between the detection electrodes and the conductive layer.

In a possible implementation, the backlight source includes a plurality of light emitting control regions in an array, wherein each light emitting control region includes a plurality of the light emitting units in an array, and each row of the light emitting units in a same light emitting control region are connected in series; in the same light emitting control region, positive electrodes of first light emitting units in a plurality of rows are electrically connected to each other through a positive driving signal line, and negative electrodes of last light emitting units in the plurality of rows are electrically connected to each other through a negative driving signal line; and applying a display signal to a driving signal line, includes: applying a positive constant voltage signal to the positive driving signal line, and applying a light emitting control signal to the negative driving signal line in each light emitting control region.

In a possible implementation, in the same light emitting control region, the negative driving signal line is multiplexed as a detection input electrode, and the positive driving signal line is multiplexed as a detection output electrode; or in the same light emitting control region, the positive driving signal line is multiplexed as a detection input electrode, and the negative driving signal line is multiplexed as a detection output electrode; applying a detection signal to the driving signal line, and performing touch detection according to a change in capacitance between the detection electrode and the conductive layer, includes: applying a detection input signal to a detection input electrode in each light emitting control region, and detecting a detection output signal on a detection output electrode; and determining a change in a capacitance value between the detection input electrode and the transparent conductive layer according to the detected detection output signal, and determining a magnitude of force at a touch position according to the determined the change in the capacitance value.

The beneficial effects of the present disclosure are as follows.

According to a touch display device and a driving method thereof according to the embodiments of the present disclosure, the driving signal lines configured to drive light emitting units to emit light are multiplexed as detection electrodes, that is, the existing driving signal lines are multiplexed as the detection electrodes, it is not necessary to arrange an additional detection electrode layer in a display panel, so that the structural design of the touch display device is changed slightly, the thickness of the display panel may be not increased, and manufacturing costs are saved. Moreover, by forming capacitance between the detection electrode and a transparent conductive layer, the capacitance can be changed according to a change in touch force. In this way, when a position of the detection electrode is pressed, a distance between the detection electrode and the transparent conductive layer changes, and the capacitance between the detection electrode and the transparent conductive layer changes accordingly. In this way, a magnitude of force at the touch position is determined by the change in the capacitance value between the detection electrode and the transparent conductive layer, so that a force touch function can be realized.

DETAILED DESCRIPTION

Figure 1:
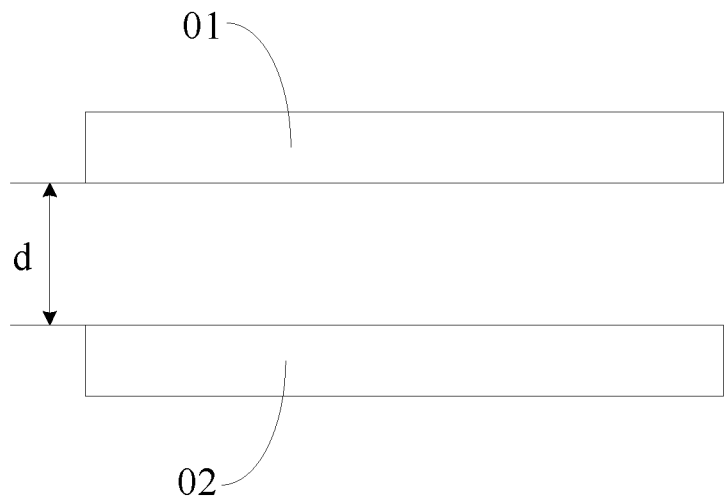
FIG. 1 is a schematic structural diagram of an existing capacitor.

In order to make the objects, technical solutions, and advantages of the present disclosure clearer, the implementation of a touch display device and a driving method thereof in accordance with the embodiments of the present disclosure will be described below in details in combination with accompanying drawings. It should be appreciated that the preferred embodiments described below are only intended to illustrate and explain the present disclosure, rather than to limit the present disclosure. The embodiments of the present application, and the features in the embodiments can be combined with each other under the condition of no confliction. It should be noted that sizes of figures, film thicknesses, and shapes in the accompanying drawings do not reflect true proportions, and only aim to illustrate the content of the present disclosure. Moreover, same or similar reference numerals are used to refer to same or similar elements or elements having same or similar functions.

As shown in FIG. 1, an insulating dielectric is provided between an electrode plate 01 and an electrode plate 02, so that the electrode plate 01 and the electrode plate 02 form a capacitance structure, and a distance between the electrode plate 01 and the electrode plate 02 is d. According to a capacitance equation: $C=\varepsilon S/4\pi kd$, wherein C is capacitance of the capacitance structure formed by the electrode plate 01 and the electrode plate 02; $\varepsilon$ is a dielectric constant of the insulating dielectric at the distance d; S is an overlapping area of the capacitance structure formed by the electrode plate 01 and the electrode plate 02; and k is an electrostatic constant. When the electrode plate 01 is pressed, the distance d decreases, so that C increases. Therefore, the magnitude of the force can be determined by detecting a change in a capacitance value.

Figure 2:
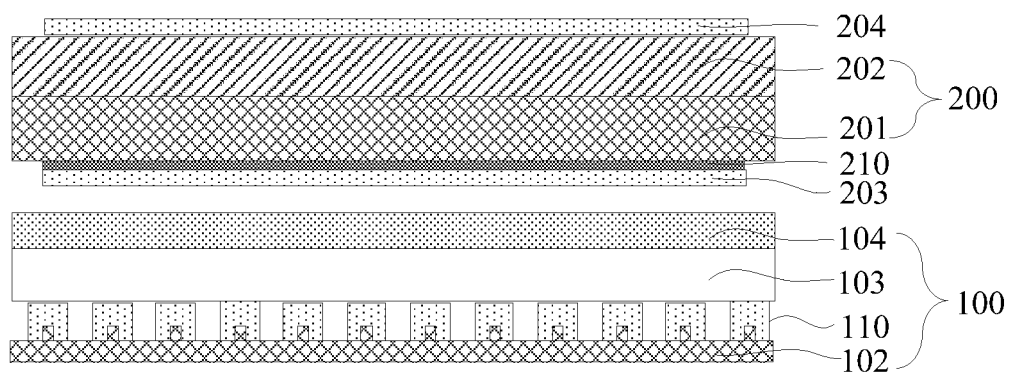
FIG. 2 is a schematic cross-sectional diagram of a touch display device in accordance with an embodiment of the present disclosure.
Figure 3:
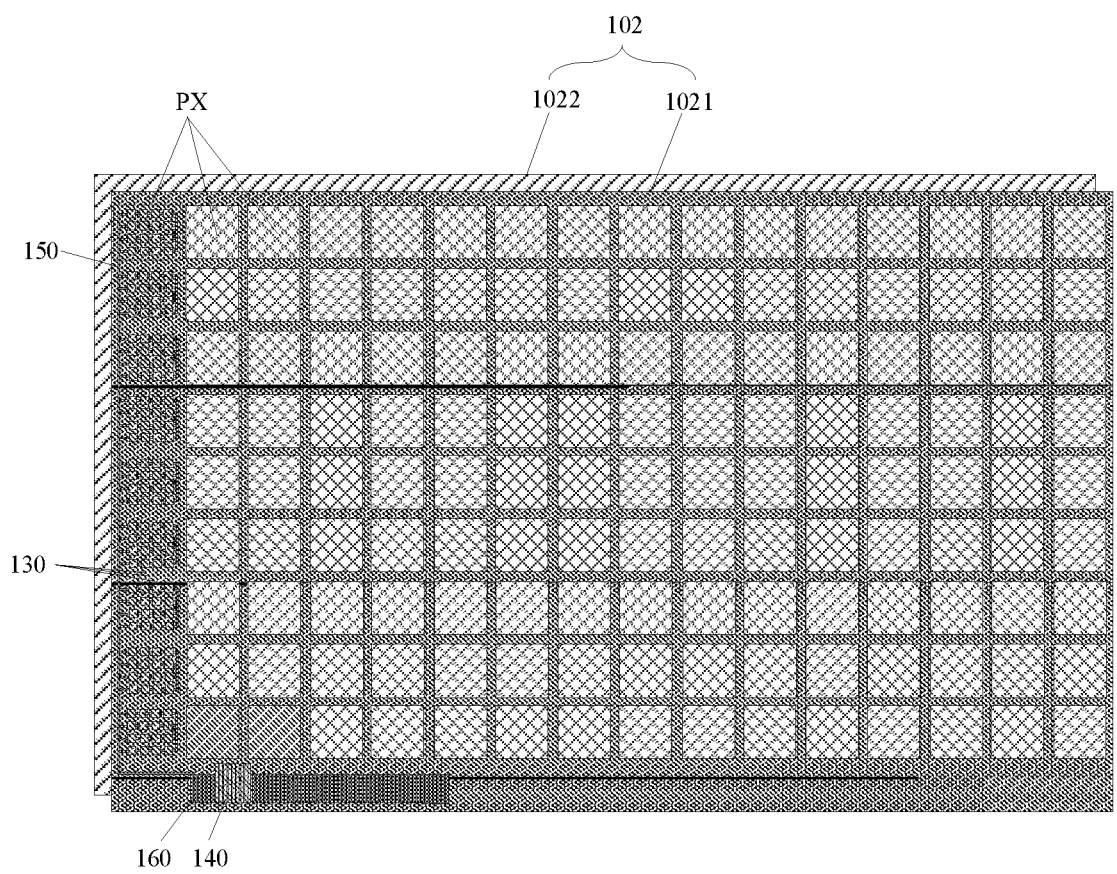
FIG. 3 is a schematic top view of a circuit board in accordance with an embodiment of the present disclosure.

An embodiment of the present disclosure provides a touch display device. As shown in FIGS. 2 and 3, the touch display device includes: a backlight source 100, a display panel 200 on a light exit side of the backlight source 100, and a transparent conductive layer 210 located on a side of the display panel 200 close to the backlight source 100. The backlight source 100 can include a plurality of light emitting units 110 and a plurality of driving signal lines (which can include positive driving signal lines 121 and negative driving signal lines 122) for driving the plurality of light emitting units 110 to emit light. The driving signal lines are multiplexed as detection electrodes, the detection electrode and the transparent conductive layer 210 form capacitance, and the capacitance between the detection electrode and the transparent conductive layer 210 changes according to a change in touch force.

In the touch display device according to the embodiment of the present disclosure, since the driving signal lines configured to drive the light emitting units to emit light are multiplexed as the detection electrodes, that is, the existing driving signal lines are multiplexed as the detection electrodes, it is not necessary to arrange an additional detection electrode layer in the display panel, so that the structural design of the touch display device is changed slightly, the thickness of the display panel may be not increased, and manufacturing costs are saved. Moreover, by forming the capacitance between the detection electrode and the transparent conductive layer, the capacitance can be changed according to a change in touch force. In this way, when a position of the detection electrode is pressed, the distance between the detection electrode and the transparent conductive layer changes, and the capacitance between the detection electrode and the transparent conductive layer changes accordingly. In this way, the change in the capacitance value between the detection electrode and the transparent conductive layer is used to determine a magnitude of force at the touch position, so that the force touch can be implemented.

In specific implementation, according to an embodiment of the present disclosure, as shown in FIG. 2, the display panel 200 can be a liquid crystal display panel. The liquid crystal display panel can include: an array substrate 201, and an opposite substrate 202 opposite to the array substrate 201. The touch display device further includes: a first polarizer 203 on a side of the array substrate 201 away from the opposite substrate 202, and a second polarizer 204 on a side of the opposite substrate 202 away from the array substrate 201. A material of the transparent conductive layer can be, for example, indium tin oxide (ITO). The transparent conductive layer 210 can be arranged between the backlight source 100 and the display panel 200, for example, the transparent conductive layer may be arranged below the array substrate 201 of the display panel 200. Alternatively, the transparent conductive layer 210 can also be arranged on a side of the backlight source 100 away from the display panel 200, for example, the transparent conductive layer can be a support back plate of the display panel, and details are not described herein. When the touch display device should be configured as a mobile phone, the support back plate can also be a mobile phone middle frame provided with a conductive material. Preferably, the transparent conductive layer 210 in the embodiment of the present disclosure is located between the array substrate 201 and the first polarizer 203, which can not only make the touch display device have a force touch detection function, but also shield an interference signal generated by the display panel while performing force touch detection.

In specific implementation, as shown in FIG. 2, the backlight source 100 further includes a diffusion plate 103 located on one side of the light emitting units 110 facing to the display panel 200, and an optical film 104 located on a side of the diffusion plate 103 facing to the display panel 200. The light emitting units 110 can be arranged on a circuit board 102, and the circuit board 102 can be a flexible printed circuit FPC.

Figure 7:
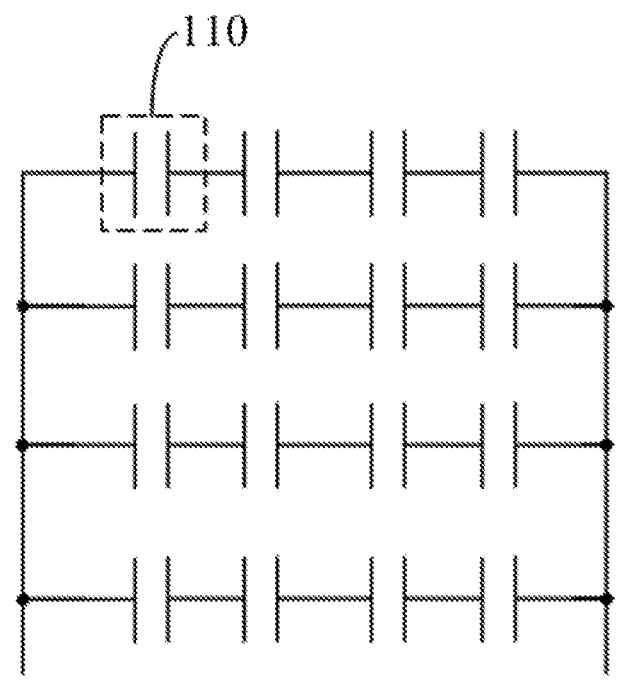
FIG. 7 is an equivalent circuit diagram when an LED chip is in short circuit in accordance with an embodiment of the present disclosure.

In specific implementation, as shown in FIG. 3, the light emitting unit 110 can include: a light emitting diode (LED) chip. The LED chip has a turn-on voltage Vc. When voltage difference between the positive electrode and negative electrode of the LED chip is greater than Vc, the LED chip is turned on to emit light, and when the voltage difference between the positive electrode and the negative electrode is less than Vc, the LED chip is turned off, as shown in FIG. 7, so that the LED chip in the light emitting unit 110 can be regarded as capacitance. In practical application, the structure of the LED chip can be the same as a structure in the prior art, and details are not described herein. The LED chips in the backlight source can be driven independently, or can also be driven in a partitioning manner after a part of LED chips are connected in series and then in parallel, which is not limited herein. FIG. 3 is used for illustration only by connecting a part of LED chips in series and then in parallel to be driven as an example.

Figure 4:
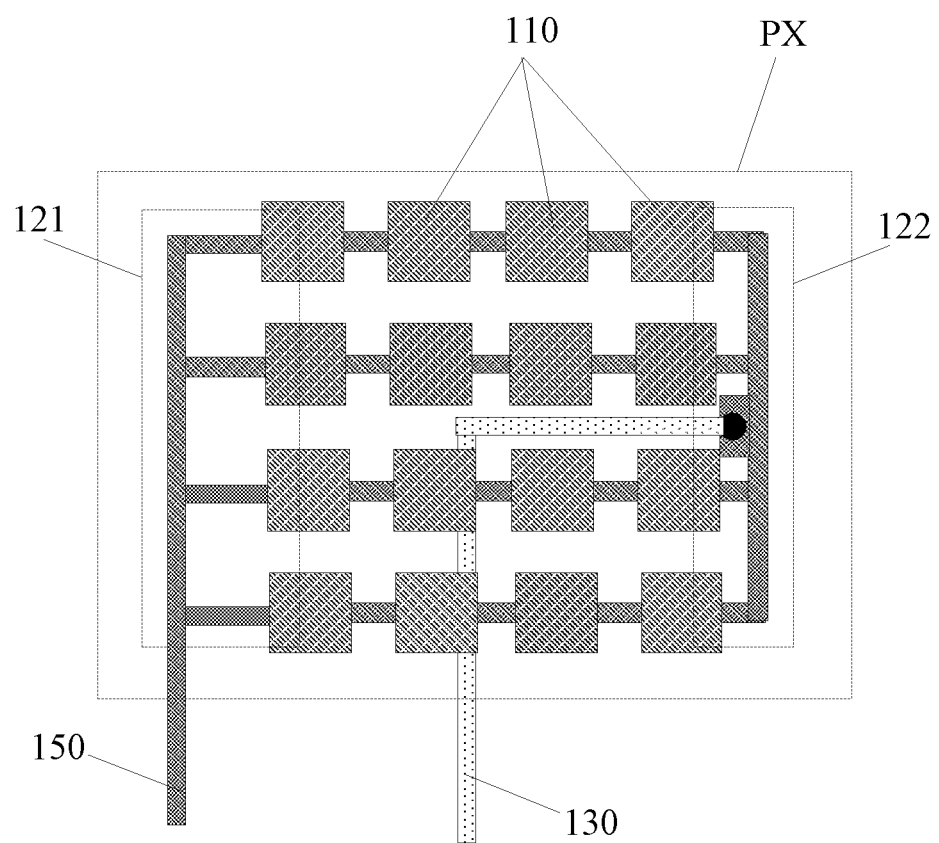
FIG. 4 is a schematic top view of a light-emitting control region in accordance with an embodiment of the present disclosure.
Figure 5:
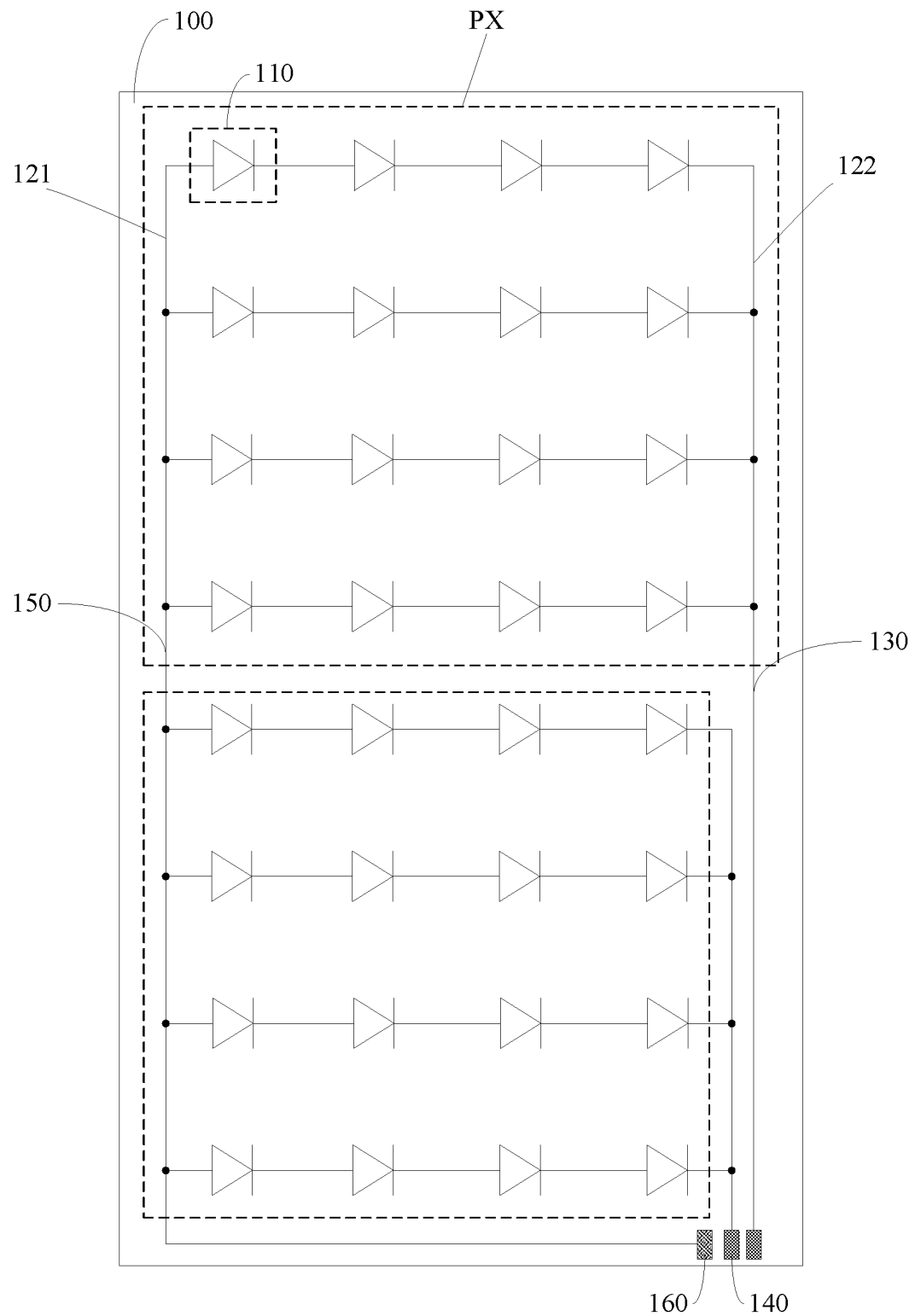
FIG. 5 is a schematic structural diagram of an equivalent circuit of a local light-emitting control region in accordance with an embodiment of the present disclosure.

In specific implementation, as shown in FIGS. 3-5, FIG. 3 is a schematic top view of a circuit board 102, FIG. 4 is a schematic enlarged structural diagram of a light emitting control region PX of FIG. 3, and FIG. 5 is a schematic diagram of a local equivalent circuit of a driving circuit board. It should be noted that FIG. 3 only shows a structure of the light emitting control region PX in the left column, and the structures of light emitting control regions in other columns can be the same as the structure of the light emitting control region in the left column. The circuit board 102 includes a first substrate 1021, a second substrate 1022 located on a side of the first substrate 1021 away from the display panel 200, and an insulating adhesive layer (not shown in the figure) bonding the first substrate 1021 and the second substrate 1022. The backlight source 100 includes a plurality of light emitting control regions PX arranged in an array, wherein each light emitting control region PX includes a plurality of light emitting units 110 arranged in an array, and each row of the light emitting units 110 in a same light emitting control region PX are connected in series. That is, for example, as shown in FIG. 5, the light emitting units 110 are light emitting diodes, a positive electrode of a second light emitting diode from the left is connected to a negative electrode of a first light emitting diode from the left, a negative electrode of a second light emitting diode from the left is connected to a positive electrode of a third light emitting diode from the left, and others are connected in series in a similar way. In a same light emitting control region PX, positive electrodes of first light emitting units 110 in rows are electrically connected to each other through a positive driving signal line 121, and negative electrodes of last light emitting units 110 in the rows are electrically connected to each other through a negative driving signal line 122. That is, a driving signal line can include: a signal line that electrically connects the light emitting units 110 in the same light emitting control region PX, for example, the driving signal line can include the positive driving signal line 121 and the negative driving signal line 122.

Specifically, for example, each light emitting control region PX includes 16 LED chips, and the 16 LED chips are arranged in an array of 4 rows by 4 columns. Each row of LED chips are connected in series, first LED chips in the 4 rows (i.e., LED chips in a first column) are electrically connected to each other, and last LED chips in the 4 rows (i.e., LED chips in a fourth column) are electrically connected to each other. In this way, the LED chips in the backlight source are partitioned, so that the brightness of the LED chips, when turned on, in each light emitting control region PX is controlled separately, so as to realize local dimming technology of the television backlight. Further, in order to facilitate driving and make force touch detection uniform, the numbers of the light emitting units in the light emitting control regions can be the same, so that the areas of the light emitting control regions are the same.

In specific implementation, the light emitting units 110 can be divided into light emitting control regions PX of 16 columns*9 rows, 16 columns*3 rows, 8 columns*9 rows, or 8 columns*3 rows. Of course, in practical application, when application environments of the touch display device are different, precision requirements on touch and dimming are different, and therefore, the number of light emitting control regions, the number and arrangement of LED chips in the light emitting control regions PX can be designed according to requirements of an actual application environment, which is not limited herein.

In specific implementation, a detection electrode can include a plurality of detection input electrodes configured to input detection input signals and a plurality of detection output electrodes configured to output detection output signals. In an embodiment of the present disclosure, as shown in FIG. 4, in a same light emitting control region PX, a negative driving signal line 122 for last light emitting units 110 in rows electrically connected to each other can be multiplexed as a detection input electrode, so as to input a detection input signal through the negative driving signal line 120. In the same light emitting control region PX, a positive driving signal line 121 for first light emitting units 110 in the rows electrically connected to each other is multiplexed as a detection output electrode, so as to output a detection output signal through the positive driving signal line. Alternatively, in the same light emitting control region PX, the positive driving signal line of the first light emitting units 110 in the rows electrically connected to each other can also be multiplexed as the detection input electrode, so as to input the detection input signal through the positive driving signal line. Moreover, in the same light emitting control region PX, the negative driving signal line of the last light emitting units 110 in the rows electrically connected to each other can also be multiplexed as the detection output electrode, so as to output the detection output signal through the negative driving signal line.

Figure 6A:
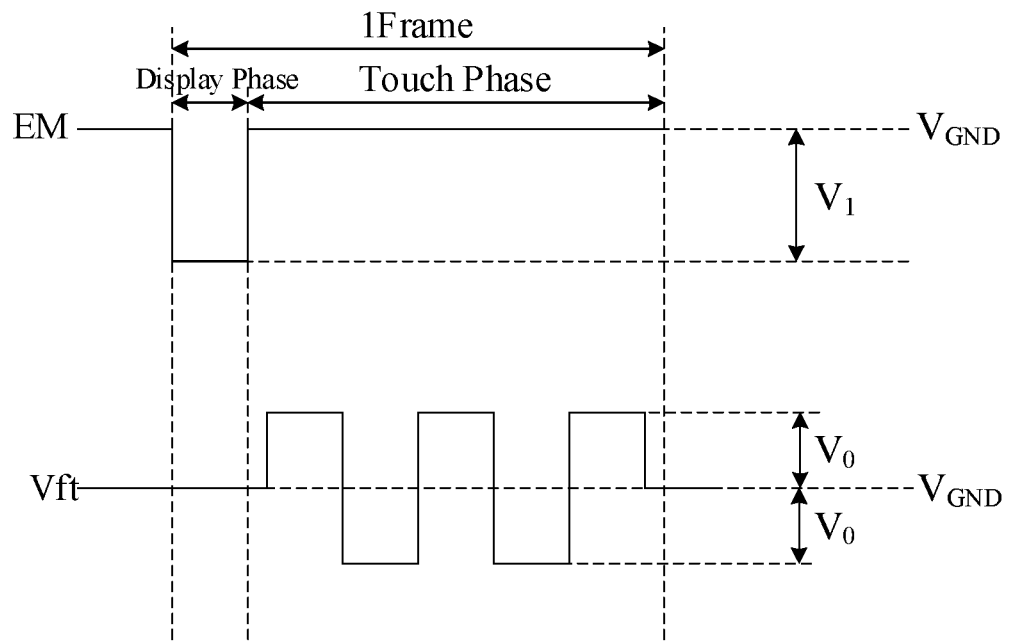
FIG. 6a is a circuit timing diagram in accordance with an embodiment of the present disclosure.
Figure 6B:
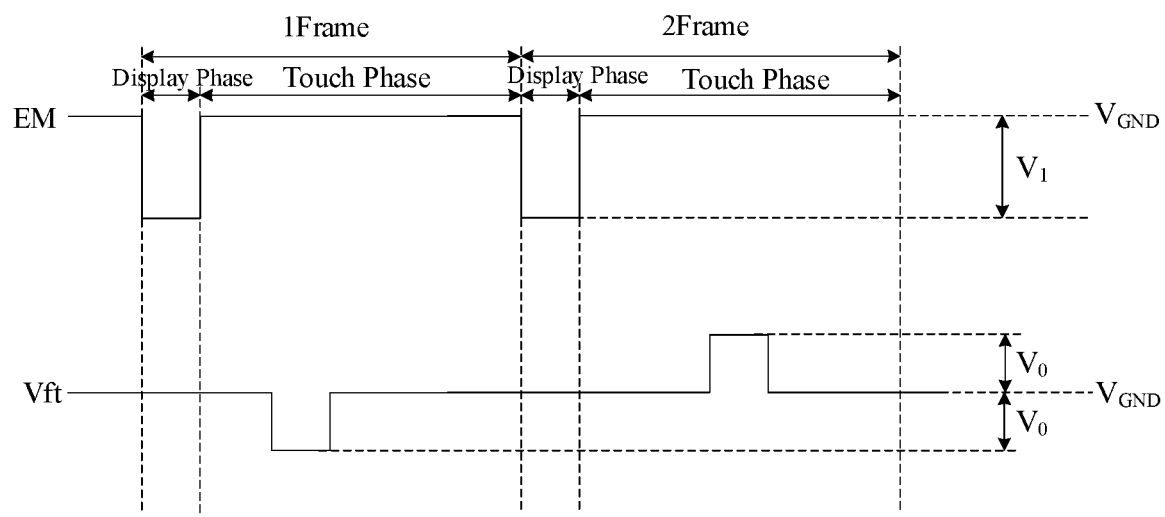
FIG. 6b is another circuit timing diagram in accordance with an embodiment of the present disclosure.

In order to drive LED chips to emit light and determine a magnitude of force at a touch position, in specific implementation, according to an embodiment of the present disclosure, the touch display device can further include a detection chip. The detection chip can be configured to apply a positive constant voltage signal to the positive driving signal line 121, and apply a light emitting control signal to the negative driving signal line 122 in each light emitting control region PX in a display phase. A voltage of the positive constant voltage signal can be a ground voltage $V_{GND}$ (generally 0V). As shown in FIGS. 6a and 6b, in order to realize the local dimming technology, a light emitting control signal EM can be set as a Pulse Width Modulation (PWM) signal, and by adjusting a pulse width of the light emitting control signal EM, LED chips of each light emitting control region are controlled to adjust the brightness of each light emitting control region. In addition, the detection chip can be further configured to, in a force detection phase, apply a detection input signal to a detection input electrode in each light emitting control region PX, and detect a detection output signal on a detection output electrode, and determine a change in a capacitance value between the detection input electrode and the transparent conductive layer 210 according to the detected detection output signal, to determine a magnitude of the force at a touch position, so that when the force is applied, the magnitude of force can be determined. Moreover, since the light emitting control regions are independent separately, a force touch position can also be determined by the detection output signal. Of course, when the light emitting units are not partitioned, the force touch position can also be determined by the detection output signal, which is not limited herein.

In specific implementation, a detection input signal is a pulse signal. In order to avoid affecting the display, according to an embodiment of the present disclosure, as shown in FIGS. 6a and 6b, a voltage amplitude $V_0$ of the detection input signal Vft can be smaller than a turn-on voltage Vc of an LED chip. And a voltage amplitude $V_1$ of the light emitting control signal EM is greater than the turn-on voltage Vc of the LED chip. Moreover, generally in the local dimming technology, each light emitting control region in the backlight source has a light emitting period and a non-light emitting period within a frame display time. In order not to affect the display, a force detection phase can be set in the non-light emitting period. Taking the light emitting control signal EM and the detection input signal Vft input to one light emitting control region as an example, as shown in FIG. 6a, continuous multiple pulse signals of the detection input signal Vft can be set in a same force detection phase of one display frame. Alternatively, as shown in FIG. 6b, the continuous multiple pulse signals of the detection input signal Vft can also be set in force detection phases of continuous multiple display frames, respectively. In this way, since a time interval of one display frame is small, the pulse signals in the continuous multiple display frames can be regarded as a whole to be taken as the detection input signal Vft, for example, a pulse of the detection input signal Vft is set in a force detection phase Touch of a first display frame 1 Frame, and another pulse of the detection input signal Vft is set in a force detection phase Touch of a second display frame 2 Frame. Of course, an implementation manner of the detection input signal Vft can be designed and determined according to an actual application environment, which is not limited herein.

In specific implementation, according to an embodiment of the present disclosure, as shown in FIGS. 3-5, the touch display device can also include: negative lines 130 one-to-one corresponding to light emitting control regions PX, and negative connection terminals 140 one-to-one corresponding to the light emitting control regions PX, wherein the negative driving signal line 122 (i.e., the negative driving signal line for connection of negative electrodes of LED chips in a fourth column in each light emitting control region PX) in each light emitting control region PX is electrically connected to a corresponding negative connection terminal 140 through a corresponding negative line 130, and each negative connection terminal 140 is electrically connected to a detection chip. In this way, the detection chip can input a light emitting control signal to the connected negative driving signal line 122 in the display phase, and input a detection input signal to the connected negative driving signal line 122 in the force detection phase.

In specific implementation, according to an embodiment of the present disclosure, as shown in FIGS. 3-5, the touch display device further includes: positive lines 150 located between column gaps of the adjacent light emitting control regions PX, and a positive connection terminal 160 electrically connected to the positive line 150, wherein positive driving signal lines 121 in each column of the light emitting control regions PX are electrically connected to the positive connection terminal 160 through one positive line 150, and the positive connection terminal 160 is electrically connected to the detection chip. In this way, the detection chip can input a positive constant voltage signal to the connected positive driving signal line 121 in the display phase, and can detect a detection output signal on the connected positive driving signal line 121 in the force detection phase.

In specific implementation, the light emitting units 110, the positive driving signal lines 121, the negative driving signal lines 122, and the positive lines 150 can be arranged on the first substrate 1021. The negative lines 130 are located on the second substrate 1022, and are electrically connected to the corresponding negative driving signal lines 122 through via holes penetrating through an insulating adhesive layer and the first substrate 1021.

In specific implementation, the positive driving signal lines 121 can be made of a same material in a same layer. In this way, the positive driving signal lines can be formed through one patterning process, so that the preparation process can be simplified, production costs are saved, and production efficiency is improved. Or, in specific implementation, the negative driving signal lines 122 can be made of a same material in a same layer. In this way, the negative driving signal lines 122 can be formed through one patterning process, so that the preparation process can be simplified, production costs are saved, and production efficiency is improved. Further, the positive driving signal lines 121 and the negative driving signal lines 122 can be made of a same material in a same layer. In this way, the positive driving signal lines 121 and the negative driving signal lines 122 can be formed through one patterning process, so that the preparation process can be simplified, production costs can be saved, and production efficiency is improved.

Taking structures shown in FIGS. 3-5 as an example, in combination with a driving timing diagram shown in FIG. 6a, a working process of the touch display device according to the embodiment of the present disclosure is described below. FIG. 6a only takes a signal input to one light emitting control region PX as an example. As shown in FIGS. 3-5, one display frame 1Frame can include: a display phase Display and a force detection phase Touch.

In the display phase Display, a detection chip inputs a positive constant voltage signal having a voltage $V_{GND}$ to LED chips in each light emitting control region PX through a positive connection terminal 160, and inputs a light emitting control signal EM to LED chips in each light emitting control region PX through each negative connection terminal 140, wherein a pulse width of the light emitting control signal EM needs to be determined according to brightness required by a corresponding light emitting control region PX. Since the brightness required by different light emitting control regions PX can be different, the durations of display phases Display corresponding to different light emitting control regions can also be different.

Figure 8:
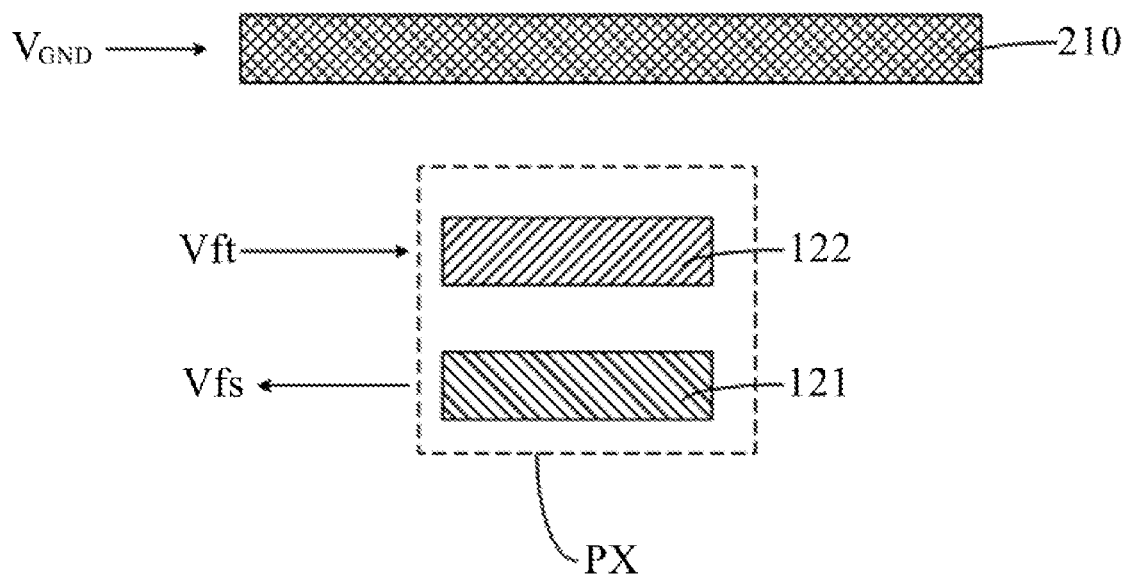
FIG. 8 is an equivalent circuit diagram of a force detection phase in accordance with an embodiment of the present disclosure.

In the force detection phase Touch, the equivalent circuit diagram of structures shown in FIGS. 3-5 in the force detection phase is shown in FIG. 8. LED chips in light emitting units 110 are equivalent to capacitance. The detection chip sequentially applies a detection input signal Vft to a detection input electrode of each light emitting control region PX through each negative connection terminal 140, and detects a detection output signal on a detection output electrode. Specifically, the detection chip applies a detection input signal Vft to a detection input electrode of a corresponding light emitting control region PX through a first negative connection terminal 140, and detects a detection output signal Vfs on a detection output electrode through a positive connection terminal 160 and a positive line 150, to obtain the detection output signal Vfs corresponding to the light emitting control region PX. Then, the detection chip applies a detection input signal Vft to a detection input electrode of a corresponding light emitting control region PX through a second negative connection terminal 140, and detects a detection output signal Vfs on a detection output electrode through a positive connection terminal 160 and a positive line 150, to obtain the detection output signal Vfs corresponding to the light emitting control region PX. Subsequently, the rest will be done in the same manner, and details are not described herein. With the detection chip, according to the detected detection output signal Vfs corresponding to each light emitting control region PX, a change in a capacitance value between the detection input electrode corresponding to each light emitting control region PX and a transparent conductive layer 210 can be determined. Therefore, a magnitude of force at a touch position is determined according to the determined change in the capacitance value corresponding to each light emitting control region PX, so that when the force is applied, the magnitude of force can be determined.

Taking a light emitting control region PX corresponding to a first negative connection terminal as an example, when the force isn't applied to the light emitting control region PX, a distance between a negative driving signal line 122 as a detection input electrode and a transparent conductive layer 210 does not change, and a capacitance value between the negative driving signal line 122 and the transparent conductive layer 210 does not change. Therefore, the capacitance value between the negative driving signal line 122 and a positive driving signal line 121 does not change either, so that a detection output signal Vfs does not change either. When the force is applied to the light emitting control region PX, the distance between the negative driving signal line 122 as the detection input electrode and the transparent conductive layer 210 becomes smaller, and the capacitance value between the negative driving signal line 122 and the transparent conductive layer 210 becomes smaller. Therefore, the capacitance value between the negative driving signal line 122 and the positive driving signal line 121 changes too, so that the detection output signal Vfs changes too. In this way, a change in the capacitance value corresponding to the light emitting control region PX can be determined by a change in the detection output signal Vfs, and further a magnitude of force at the touch position can be determined. For the same reason, the rest is not repeated herein.

In specific implementation, the touch display device according to the embodiments of the present disclosure can be any product or component having a display function, such as a mobile phone and a tablet computer. Those skilled in the art should understand that there are other indispensable components of the display device, and details are repeated herein and also should not be taken as a limitation on the present disclosure.

On the basis of the same inventive concept, an embodiment of the present disclosure further provides a driving method of the touch display device according to the embodiment of the present disclosure. The method includes: a display phase and a force detection phase, wherein in the display phase, applying a display signal to the driving signal lines; and in the force detection phase, applying a constant potential to a transparent conductive layer, applying a detection signal to the driving signal lines, and performing touch detection according to a change in capacitance between a detection electrode and the conductive layer.

In specific implementation, a backlight source includes a plurality of light emitting control regions arranged in an array, wherein each light emitting control region includes a plurality of light emitting units in an array, and each row of the light emitting units in a same light emitting control region are connected in series; in a same light emitting control region, positive electrodes of first light emitting units in a plurality of rows are electrically connected to each other through a positive driving signal line, and negative electrodes of last light emitting units in the plurality of rows are electrically connected to each other through a negative driving signal line. In the embodiment of the present disclosure, applying a display signal to the driving signal lines, includes: applying a positive constant voltage signal to the positive driving signal line, and applying a light emitting control signal to the negative driving signal line in each light emitting control region.

In specific implementation, in a same light emitting control region, a negative driving signal line is multiplexed as a detection input electrode, and a positive driving signal line is multiplexed as a detection output electrode; or in the same light emitting control region, the positive driving signal line is multiplexed as the detection input electrode, and the negative driving signal line is multiplexed as the detection output electrode. In the embodiment of the present disclosure, applying a detection signal to the driving signal lines, and performing touch detection according to a change in capacitance between the detection electrode and the conductive layer, includes: in the force detection phase, applying a detection input signal to a detection input electrode in each light emitting control region, and detecting a detection output signal on a detection output electrode; determining a change in a capacitance value between the detection input electrode and the transparent conductive layer according to the detected detection output signal, and determining a magnitude of force at a touch position according to the determined change in the capacitance value.

According to a touch display device and a driving method thereof according to embodiments of the present disclosure, a driving signal line configured to drive a light emitting unit to emit light is multiplexed as a detection electrode, that is, an existing driving signal line is multiplexed as a detection electrode, it is not necessary to arrange an additional detection electrode layer in a display panel, so that the structural design of the touch display device is changed slightly, the thickness of the display panel may be not increased, and manufacturing costs are saved. Moreover, by forming capacitance between the detection electrode and the transparent conductive layer, the capacitance can be changed according to a change in touch pressure. In this way, when a position of the detection electrode is pressed, a distance between the detection electrode and the transparent conductive layer changes, and the capacitance between the detection electrode and the transparent conductive layer changes accordingly. In this way, a magnitude of force at the touch position is determined by the change in the capacitance value between the detection electrode and the transparent conductive layer, so that the force touch function can be realized.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

The invention claimed is:

1. A touch display device, comprising:
   a backlight source, comprising: a plurality of light emitting units, and a plurality of driving signal lines for driving the plurality of light emitting units to emit light, wherein the driving signal lines are multiplexed as detection electrodes;
   a display panel on a light exit side of the backlight source; and
   a transparent conductive layer on a side of the display panel close to the backlight source, wherein capacitance between the detection electrodes and the transparent conductive layer changes according to a change in touch force.

2. The touch display device according to claim 1, wherein the backlight source comprises a plurality of light emitting control regions in an array, each of the light emitting control regions comprises a plurality of the light emitting units in an array, and each row of the light emitting units in a same light emitting control region are connected in series; and
   in the same light emitting control region, positive electrodes of first light emitting units in a plurality of rows are electrically connected to each other through a positive driving signal line, and negative electrodes of last light emitting units in the plurality of rows are electrically connected to each other through a negative driving signal line.

3. The touch display device according to claim 2, wherein the detection electrodes comprise: a plurality of detection input electrodes and a plurality of detection output electrodes; and
   in the same light emitting control region, the negative driving signal line is multiplexed as a detection input electrode, and the positive driving signal line is multiplexed as a detection output electrode.

4. The touch display device according to claim 3, further comprising: a detection chip, configured to, in a display phase, apply a positive constant voltage signal to the positive driving signal line, and apply a light emitting control signal to the negative driving signal line in each light emitting control region; in a force detection phase, apply a detection input signal to the detection input electrode in each light emitting control region, and detect a detection output signal on the detection output electrode, and determine a change in a capacitance value between the detection input electrode and the transparent conductive layer according to the detected detection output signal, and determine a magnitude of force at a touch position according to the determined change in the capacitance value.

5. The touch display device according to claim 4, wherein the light emitting units comprise light emitting diode (LED) chips; and a voltage amplitude of the detection input signal is smaller than turn-on voltages of the light emitting diode (LED) chips.

6. The touch display device according to claim 4, further comprising: negative lines one-to-one corresponding to the light emitting control regions and negative connection terminals one-to-one corresponding to the light emitting control regions; and the negative driving signal line in each light emitting control region is electrically connected to the corresponding negative connection terminal through the corresponding negative line, and each negative connection terminal is electrically connected to the detection chip.

7. The touch display device according to claim 6, further comprising: positive lines between column gaps of the adjacent light emitting control regions, and a positive connection terminal electrically connected to the positive lines; and the positive driving signal lines in each column of the light emitting control regions are electrically connected to the positive connection terminal through one positive line; and the positive connection terminal is electrically connected to the detection chip.

8. The touch display device according to claim 7, wherein the backlight source further comprises: a circuit board driving the light emitting units; and the circuit board comprises: a first substrate, a second substrate on a side of the first substrate away from the display panel, and an insulating adhesive layer bonding the first substrate and the second substrate.

9. The touch display device according to claim 8, wherein the light emitting units, the positive driving signal lines, the negative driving signal lines, and the positive lines are on the first substrate.

10. The touch display device according to claim 9, wherein the negative lines are on the second substrate, and the negative lines are electrically connected to the corresponding negative driving signal lines through via holes penetrating through the insulating adhesive layer and the first substrate.

11. The touch display device according to claim 2, wherein the detection electrodes comprise: a plurality of detection input electrodes and a plurality of detection output electrodes; and in the same light emitting control region, the positive driving signal line is multiplexed as a detection input electrode, and the negative driving signal line is multiplexed as a detection output electrode.

12. The touch display device according to claim 2, wherein the positive driving signal lines are made of a same material and in a same layer; or the negative driving signal ((s)) lines are made of a same material and in a same layer.

13. The touch display device according to claim 2, wherein the positive driving signal lines and the negative driving signal lines are made of a same material and in a same layer.

14. The touch display device according to claim 2, wherein a ((the)) number of the plurality of light emitting units in each of the light emitting control regions are the same.

15. The touch display device according to claim 1, wherein the display panel is a liquid crystal display panel; the liquid crystal display panel comprises: an array substrate, and an opposite substrate opposite to the array substrate; and the touch display device further comprises: a first polarizer on a side of the array substrate away from the opposite substrate, and a second polarizer on a side of the opposite substrate away from the array substrate; and the transparent conductive layer is between the array substrate and the first polarizer.

16. The touch display device according to claim 15, wherein a material of the transparent conductive layer is indium tin oxide.

17. The touch display device according to claim 15, wherein the backlight source further comprises a diffusion plate on one side of the light emitting units facing to the display panel, and an optical film on a side of the diffusion plate facing to the display panel.

18. A driving method of the touch display device according to any one of claim 1, comprising: a display phase and a force detection phase, wherein, in the display phase, applying a display signal to the driving signal lines;

in the force detection phase, applying a constant potential to the transparent conductive layer, applying a detection signal to the driving signal lines, and performing touch detection according to a change in the capacitance between the detection electrode((s)) and the transparent conductive layer.

19. The driving method according to claim 18, wherein the backlight source comprises a plurality of light emitting control regions in an array, each of the light emitting control regions comprises a plurality of light emitting units in an array, and each row of the light emitting units in a same light emitting control region are connected in series; in the same light emitting control region, positive electrodes of first light emitting units in a plurality of rows are electrically connected to each other through a positive driving signal line, and negative electrodes of last light emitting units in the plurality of rows are electrically connected to each other through a negative driving signal line; and applying a display signal to the driving signal lines, comprises:

applying a positive constant voltage signal to the positive driving signal line, and applying a light emitting control signal to the negative driving signal line in each light emitting control region.

20. The driving method according to claim 19, wherein in the same light emitting control region, the negative driving signal line is multiplexed as a detection input electrode, and the positive driving signal line is multiplexed as a detection output electrode; or in the same light emitting control region, the positive driving signal line is multiplexed as a detection input electrode, and the negative driving signal line is multiplexed as a detection output electrode;

applying a detection signal to the driving signal lines, and performing touch detection according to a change in the capacitance between the detection electrodes and the transparent conductive layer, comprise:

applying a detection input signal to the detection input electrode in each light emitting control region, and detecting a detection output signal on the detection output electrode; and determining a change in the ((a)) capacitance value between the detection input electrode and the transparent conductive layer according to the detected detection output signal, and determining a magnitude of force at a touch position according to the determined change in the capacitance value.

* * * * *